United States Patent
Bartov et al.

(10) Patent No.: US 9,518,860 B2
(45) Date of Patent: Dec. 13, 2016

(54) SYSTEM AND METHOD FOR FUZZY LOGIC BASED MEASUREMENT OF A CONTENT OF A BIN

(71) Applicants: Avishai Bartov, Hod-Hasharon (IL); Yossi Zlotnick, Ramat-Hasharon (IL)

(72) Inventors: Avishai Bartov, Hod-Hasharon (IL); Yossi Zlotnick, Ramat-Hasharon (IL)

(73) Assignee: APM AUTOMATION SOLUTIONS LTD, Tel Aviv (IL)

( * ) Notice: Subject to any disclaimer, the term of this patent is extended or adjusted under 35 U.S.C. 154(b) by 832 days.

(21) Appl. No.: 13/755,176

(22) Filed: Jan. 31, 2013

(65) Prior Publication Data
US 2014/0214359 A1    Jul. 31, 2014

(51) Int. Cl.
G01F 23/76 (2006.01)
G01F 23/296 (2006.01)
G01F 23/00 (2006.01)

(52) U.S. Cl.
CPC ....... G01F 23/2962 (2013.01); G01F 23/0076 (2013.01)

(58) Field of Classification Search
CPC .. G01F 23/284; G01F 23/2962; G01F 23/296; G01S 13/88; G01S 7/527; G01S 7/539; G01S 15/88; G01S 7/52004; G01J 1/00
USPC .................. 367/87, 99, 908; 702/3, 55, 156
See application file for complete search history.

(56) References Cited

U.S. PATENT DOCUMENTS

| | | | | |
|---|---|---|---|---|
| 5,247,303 A | * | 9/1993 | Cornelius | G01S 13/20 342/26 D |
| 5,319,611 A | * | 6/1994 | Korba | G01S 7/52003 367/909 |
| 5,357,965 A | * | 10/1994 | Hall | G01S 15/8981 600/454 |
| 5,555,886 A | * | 9/1996 | Weng | A61B 5/02007 600/454 |
| 5,587,969 A | * | 12/1996 | Kroemer | G01F 23/296 367/908 |
| 5,592,091 A | * | 1/1997 | Manabe | G01R 33/3875 324/319 |
| 5,939,622 A | * | 8/1999 | Fay | G01F 23/296 73/61.63 |
| 5,940,523 A | * | 8/1999 | Cornman | G01S 13/95 342/171 |
| 6,307,500 B1 | * | 10/2001 | Cornman | G01S 13/58 342/192 |
| 6,459,973 B1 | * | 10/2002 | Breed | G01S 15/04 180/268 |
| 2005/0060149 A1 | * | 3/2005 | Guduru | G10L 25/78 704/233 |
| 2006/0052954 A1 | * | 3/2006 | Welle | G01F 23/284 702/55 |

(Continued)

*Primary Examiner* — Toan Le
*Assistant Examiner* — Jeffrey Aiello
(74) *Attorney, Agent, or Firm* — Reches Patents

(57) ABSTRACT

A method, non-transitory computer readable medium and a system that includes a fuzzy logic module arranged to apply a fuzzy logic algorithm for calculating, in response to received echoes that are received by a receiver, confidence levels of origins of received echoes; wherein the received echoes are reflected or scattered from the origins; and a volume calculator that is arranged to calculate a volume of the content in response to (a) estimated locations of the origins, and (b) the confidence levels of the origins.

30 Claims, 10 Drawing Sheets

(56) References Cited

U.S. PATENT DOCUMENTS

| | | | |
|---|---|---|---|
| 2009/0290452 A1* | 11/2009 | Lyon | G01F 23/2962 367/99 |
| 2012/0051185 A1* | 3/2012 | Ferreira | G01S 7/527 367/100 |
| 2012/0201100 A1* | 8/2012 | Lyon | G01F 23/284 367/99 |
| 2013/0207836 A1* | 8/2013 | Schmitt | G01F 23/284 342/124 |
| 2014/0214359 A1* | 7/2014 | Bartov | G01F 23/2962 702/156 |

* cited by examiner

SYSTEM AND METHOD FOR FUZZY LOGIC BASED MEASUREMENT OF A CONTENT OF A BIN

BACKGROUND OF THE INVENTION

The present invention relates to monitoring of inventory and to process measurement, and, more particularly, to a system and method for measuring the content of a bin.

The monitoring of liquid inventory generally is straightforward. By contrast, the monitoring of bulk solid inventory that consists of particulates piled up inside a bin such as a silo often is very difficult. Examples of such bulk solid inventory include cement and sand for construction, grain, fertilizer, etc. The measurement of the level of bulk materials inside a bin is a problem that has not yet been solved adequately. The conditions inside bins typically are unfavorable (dust, extreme temperatures, etc.) and the contents of the bulk material stored in the bins often do not have a flat surface and are not always isotropic. Other difficulties arises from the wide variety of bin shapes in use and from the explosive atmospheres inside some bins.

The scope of the term "bin" as used herein includes any storage container, for bulk particulate solids, whose structure defines an interior volume for receiving and storing the solids. Such a bin may be closed above, below and on all sides, as is the case when the bin is a silo, vessel or tank, or may be open above or on one or more sides. The example of a "bin" that is used in the detailed description of the present invention below is a silo; but it will be obvious to those skilled in the art how to apply the principles of the present invention to any type of bin.

Five principal methods are known for continuous measurement of the content of a bin such as a silo.

An electromechanical (yo-yo) level sensor consists essentially of a weight at one end of a reel of tape. The weight is allowed to descend in the silo to the depth at which the upper surface of the content is situated. When the weight settles on top of the content, the tension in the tape slackens. The weight then is retracted to the top set point. The height of the content is inferred from the time required to retract the weight or from the measured tape length.

Mechanical devices such as yo-yo sensors are unreliable. They tend to get clogged by dust and to get stuck on obstacles such as pumps and rods inside the silos.

Ultrasonic level sensors work on the principle of ultrasonic sound wave transmission and reception. High frequency sound waves from a transmitter are reflected by the upper surface of the content to a receiver. The height of the content is inferred from the round-trip travel time. Such sensors have limited range and work poorly in the presence of dust. In addition, such devices need to be custom-designed for different types of silo.

Radar level sensors work on the principle of electromagnetic wave transmission and reception. Electromagnetic waves from a transmitter are reflected by the upper surface of the content to a receiver. The height of the content is inferred from the round-trip travel time.

Capacitance sensors measure the capacitance between two metallic rods or between a metallic rod and the ground. Because the silo content has a different dielectric constant than air, the capacitance changes according to the level of the upper surface of the content between the two rods or between a rod and the ground. Such sensors tend to be inaccurate and are sensitive to humidity and to type of material stored in the silo.

All the prior art sensors discussed above are insensitive to the shape of the contents, and so are inaccurate in the presence of a common phenomenon called "coning" that occurs as bulk particulate solids are withdrawn via the base of a bin: an inverted conical hole, whose apex is directly above the point of withdrawal, tends to form in the bulk particulate solids. A similar phenomenon occurs as bulk particulate solids are added to a bin from the top: the solids tend to pile up in a cone whose apex is directly below the point of insertion of the solids. These sensors also work poorly in bins with complicated geometries and in the presence of obstacles.

A weight gauge measures the weight of a mobile silo and its content by measuring the tension in the rods that hold the silo. Installation of such gauges is complex, and they are suitable only for mobile silos with metallic legs.

There is thus a widely recognized need for, and it would be highly advantageous to have, a method of measuring the content of a bin such as a silo that would overcome the disadvantages of presently known methods as described above. In particular, it is not known in the prior art to map the upper surface of the bin contents in three dimensions.

SUMMARY OF THE INVENTION

According to an embodiment of the invention there is provided a system for estimating a volume of a content of a bin, the system may include: a fuzzy logic module arranged to apply a fuzzy logic algorithm for calculating, in response to received echoes that are received by a receiver, confidence levels of origins of received echoes; wherein the received echoes are reflected or scattered from the origins; and a volume calculator that may be arranged to calculate the volume of the content in response to (a) estimated locations of the origins, and (b) the confidence levels of the origins.

The system may include the receiver, wherein the receiver may be arranged to detect peaks of the received echoes, and calculate time of arrival of the peaks and direction of arrival of the received echoes.

The receiver may be arranged to calculate received echoes parameters; and wherein the fuzzy logic module may be arranged to calculate received echoes attributes by applying a fuzzy logic algorithm on the received echoes parameter.

The fuzzy logic module may be arranged to calculate at least one received echo attribute out of a signal to noise ratio attribute and a constant false alarm threshold.

The fuzzy logic module may be arranged to apply a non-linear fuzzy logic algorithm.

The fuzzy logic module may be arranged to apply a linear fuzzy logic algorithm.

The volume calculator may be arranged to maintain a database of reference echoes and to compare received echoes to reference echoes to provide comparison results.

The volume calculator may be arranged to update at least one attribute of a reference echo in response to a comparison result out of the comparison results.

The volume calculator may be arranged to determine to update the at least one attribute of the reference echo if the comparison result indicates that a signal to noise ratio of the reference echo is lower than a signal to noise ratio of a received echo that corresponds to the reference echo.

The volume calculator may be arranged to delete from the database of reference echo a reference echo that is associated with an origin that did not reflect or scatter a received echo during multiple transmission and reception cycles.

The volume calculator may be arranged to delete the reference echo if during the multiple transmission and reception cycles a noise level facilitated a reception of received echoes from the origin.

The volume calculator may be arranged to detect false echoes.

The volume calculator may be arranged to change attributes of a received echo based upon attributes of another received echo.

The volume calculator may be arranged to classify a received echo as a false echo if a virtual slope formed between the origin of the received echo and an origin of another origin exceeds a maximal allowable slope of the content.

According to an embodiment of the invention there may be provided a computerized method for estimating a volume of content of a bin, the method may include: applying, by a fuzzy logic module, a fuzzy logic algorithm for calculating, in response to received echoes that are received by a receiver, confidence levels of origins of received echoes; wherein the received echoes are reflected or scattered from the origins; and calculating, by a volume calculator, the volume of the content in response to (a) estimated locations of the origins, and (b) the confidence levels of the origins.

The method may include detecting peaks of the received echoes, and calculating time of arrival of the peaks and direction of arrival of the received echoes.

The method may include calculating received echoes parameters; and calculating received echoes attributes by applying a fuzzy logic algorithm on the received echoes parameter.

The method may include calculating at least one received echo attribute out of a signal to noise ratio attribute and a constant false alarm threshold.

The method may include applying a non-linear fuzzy logic algorithm.

The method may include applying a linear fuzzy logic algorithm.

The method may include maintaining a database of reference echoes and comparing received echoes to reference echoes to provide comparison results.

The method may include updating at least one attribute of a reference echo in response to a comparison result out of the comparison results.

The method may include determining to update the at least one attribute of the reference echo if the comparison result indicates that a signal to noise ratio of the reference echo is lower than a signal to noise ratio of a received echo that corresponds to the reference echo.

The method may include deleting from the database of reference echo a reference echo that is associated with an origin that did not reflect or scatter a received echo during multiple transmission and reception cycles.

The method may include deleting the reference echo if during the multiple transmission and reception cycles a noise level facilitated a reception of received echoes from the origin.

The method may include detecting false echoes.

The method may include changing attributes of a received echo based upon attributes of another received echo.

The method may include classifying a received echo as a false echo if a virtual slope formed between the origin of the received echo and an origin of another origin exceeds a maximal allowable slope of the content.

The method wherein the method comprises receiving echoes of the pulses of acoustic energy.

According to an embodiment of the invention there may be provided a non-transitory computer readable medium that stores instruction that may cause a computerized system to: apply a fuzzy logic algorithm for calculating, in response to received echoes that are received by a receiver, confidence levels of origins of received echoes; wherein the received echoes are reflected or scattered from the origins; and calculate a volume of the content in response to (a) estimated locations of the origins, and (b) the confidence levels of the origins.

The non-transitory computer readable medium may store instruction that may cause a computerized system to execute any stage or any combination of stages of any method disclosed in the specification or the claims.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
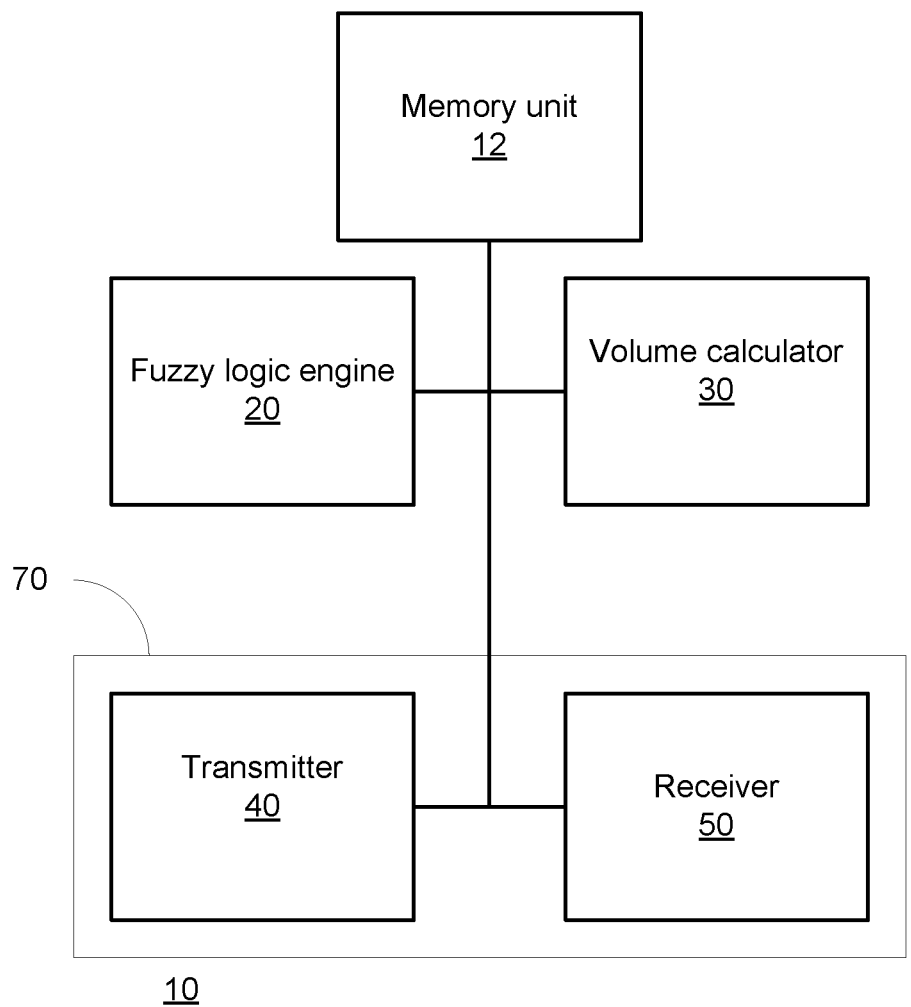
FIG. 1 is a high-level schematic functional block diagram of a system of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a system should be applied mutatis mutandis to a method that can be executed by the system.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

The present invention is of a system for measuring the quantity of material stored in a bin such as a silo, Open bin, Dome etc. Specifically, the present invention can be used to monitor inventory in a silo.

The principles and operation of content measuring according to the present invention may be better understood with reference to the drawings and the accompanying description.

The bin contains an unknown quantity of content—such as a solid content that forms an unknown three dimensional shape. For example, in a cylinder based bin with a single fill in point at the top, the content may be piled up as a cone. It is assumed that the topography of the upper surface and the dimension of the bin determine the volume of the solid material in the bin.

The term echo means a radiation signal that was received by a receiver and was scattered or reflected from an object due to a transmission of a radiation pulse.

The phrase "origin" refers a source of the echo—to a location that the receiver estimates that reflected, scattered or otherwise directed the echo towards the receiver.

The terms echo and origin are used in an interchangeable manner in the specification.

Corresponding echoes are echoes that share the same (or substantially the same) origin.

The terms "list" and "database" are non-limiting examples of a data structure and are used in an interchangeable manner.

FIG. 1 illustrates a system 10 according to an embodiment of the invention.

System 10 includes a fuzzy logic module 20, memory unit 12 and a volume calculator 30. These modules may belong to (or may form) a computerized system.

FIG. 1 illustrates system 10 as further including receiver 50 and transmitter 40. The transmitter 40 and the receiver 50 form a transceiver 70. It is noted that the inclusion of any of these components within the system 10 is optional.

The transmitter 40 can transmit pulses of radiation during multiple periods of time. The pulses of radiation can be radio frequency pulses, acoustic pulses and the like.

The receiver 50 can receive received echoes resulting from the transmission of the radiation pulses.

The pulses of acoustic energy may might be wide enough to cover, without scanning relatively large areas of the upper surface of the content—in comparison to much narrower areas that can be covered by narrow cross section radio frequency or narrow cross section (aperture of about 10 degrees) ultrasonic waves. It is noted that the invention can be applicable mutatis mutandis to large (aperture of about 60-80 degrees) cross section radio frequency pulses (for example about 1 Ghz radio frequency pulses) or to scanning systems using radio frequency or scanning systems using ultrasonic waves. The pulses of acoustic energy can have a frequency between 2-7 Hertz.

Figure 2:
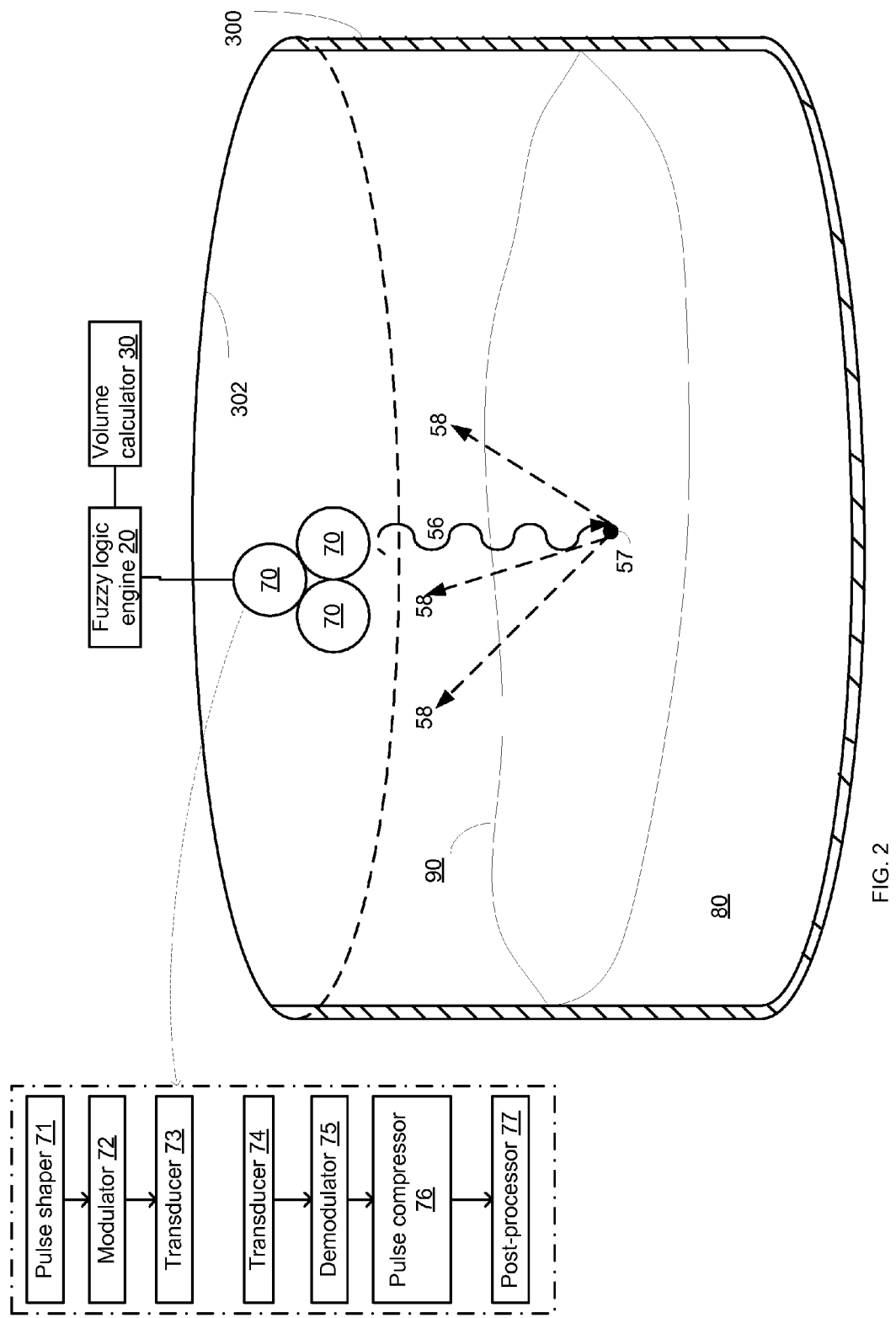
FIG. 2 is a partially cut-away view of a silo with the system of FIG. 1 mounted on the ceiling of the silo.

FIG. 2 is a partially cut-away view of a silo 300 with system 10 mounted on the ceiling 302 of silo 300 and facing an upper surface 90 of content, according to an embodiment of the invention.

Transmitter 40 and receiver 50 (of FIG. 1) are implemented by three non-collinear acoustic transceivers 70. A non-limiting example of such acoustic transceivers is illustrated in U.S. Pat. No. 8,091,421 which is incorporated herein by reference. It is noted that the number of transceivers can differ from three and that radio frequency and ultrasonic radiation can be used.

Each acoustic transceiver 70 may include a transmission path and a reception path. The transmission path may include a pulse shaper 71, a modulator 72 and a transducer (speaker) 73 while the reception path can include a transducer (microphone) 74, a demodulator 75, a pulse compressor 76 and a post processor 77 such as those illustrated in US patent application titled "Variable length ranging and direction-finding signals constructed from beamlimited kernels and sparse spreading sequences", having Ser. No. 13/041,461 filing date Mar. 7, 2011 which is incorporated herein by reference.

Pulse shaper 71 generates a baseband pulse from a kernel. Modulator 72 modulates a carrier wave with the baseband pulse. Transducer 73 launches modulated carrier wave, into a medium that supports propagation of the carrier wave, as a transmitted acoustic pulse 56, towards the upper surface 90 of the content.

Echo 58 is reflected from an echo origin 57 of the upper surface 90 and received by transducers 74. Demodulator 75 demodulates the echo to provide a received representation of the baseband pulse.

Pulse compressor 76 compresses the representation of the baseband pulse by de-convolution. The pulse compression provides a compressed pulse that is a time-shifted representation of the original kernel. Post-processor 77 applies post-processing the compressed pulse and infers the range to multiple points of the upper surface 90 as one-half of the product of the round-trip travel time of acoustic pulse 56 and echo 58.

The directional information is obtaining by using different combinations of transceivers 70 to transmit acoustic pulses and receive echoes.

One or more transceivers 70 may function at any given point of time as transmitters and may emit a pulse of acoustic energy (acoustic pulse) 56 towards the upper surface 90 of content 80 of silo 300.

Acoustic pulse 56 is represented symbolically in FIG. 2 as a waveform emerging from one of transceivers 70. An echo of acoustic pulse 56 that is reflected from upper surface 90 back towards transceivers 70 is represented in FIG. 2 by arrows 58.

Echo 58, that is received by transceivers 70 functioning as receivers 50, that in turn are capable of generating detection signals representative of the shape of the upper surface 90 of content 80.

The detection signals may be responsive to the time of arrival of the echo, relationships between time of arrival of the echo to different transceivers, and the spatial arrangement of the transceivers.

An echo will typically emanate from large surfaces, and irregular areas on the upper surface and from the silo side walls where the material touches the wall, creating a corner. The system will get the echoes one after the other, separated in time according to the range of each echo origin from the system.

It is assumed that per received echo, the system 10 (for example the receiver 50) can generate an estimation of the range (based on time of arrival TOA) of an origin of the received echo and the direction of arrival (DOA) of the received echo.

The DOA can be obtained using, for example, multiple receivers (or transceivers such as the three transceivers 70 of FIG. 2), and applying triangulation based methods (or other direction location methods) to detect the direction of each echo.

It is assumed that the bin is a noisy environment and the accuracy of the range and DOA estimation is dependent on the noise. In addition, separation between received echoes is up to the range resolution of the system and may cause additional error in the direction of estimation.

The signal to noise ratio (SNR) of a received echo is represented by a SNR attribute that may change in time. The SNR may be a function of the geometry of the echo origin and on the concentration of dust in the air at measurement time. Dust concentration may change in time (for example, typically after filling, air will be dustier than few hours later). As a result, signal strength may change in time. Noise is usually due to external noise sources such as machinery in the vicinity of the bin that may generate acoustic or electromagnetic energy.

Figure 8:
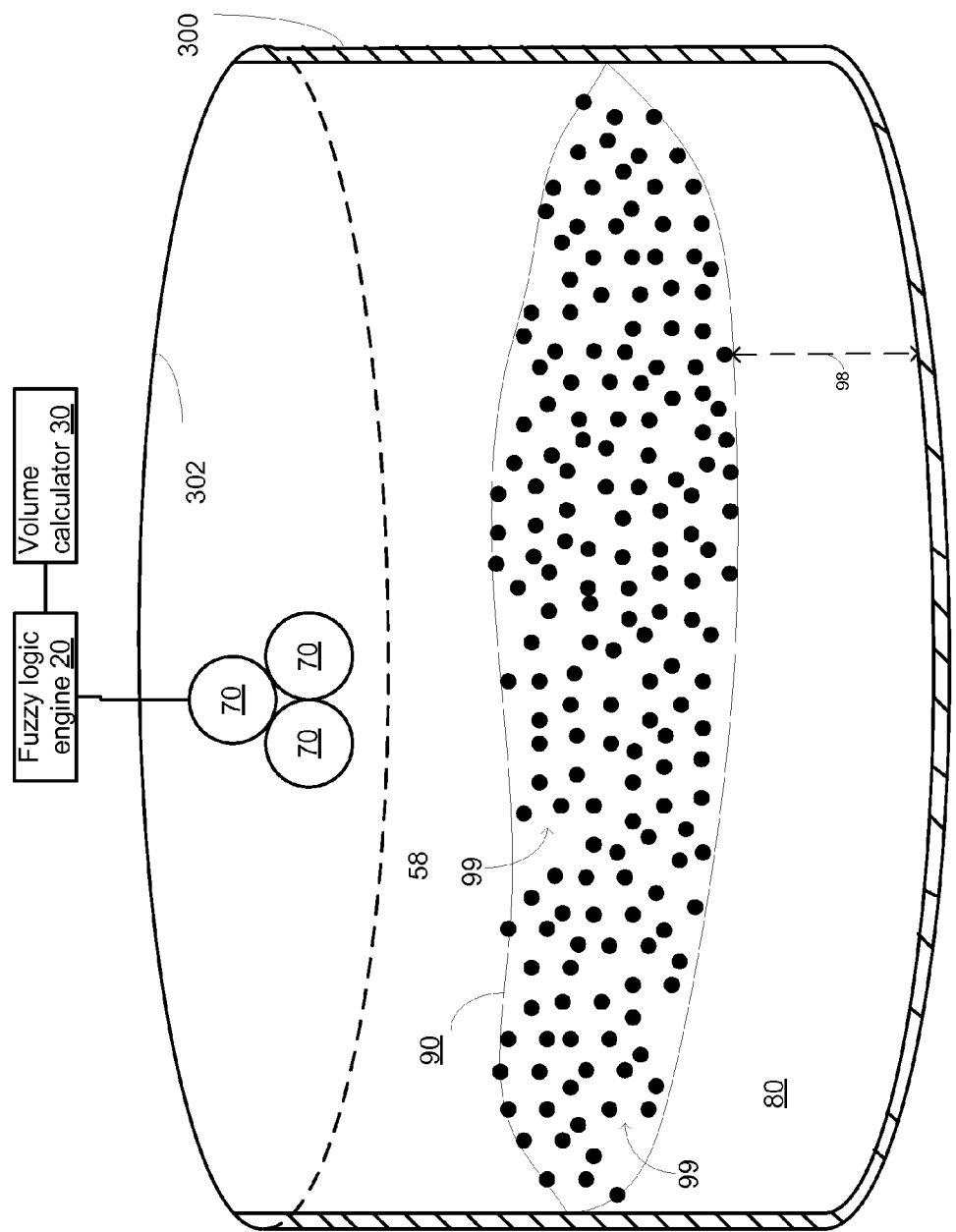
FIG. 8 is a partially cut-away view of a silo with the system of FIG. 1 mounted on the ceiling of the silo and multiple estimated points that are expected to belong to an upper surface of the content according to an embodiment of the invention.
Figure 9:
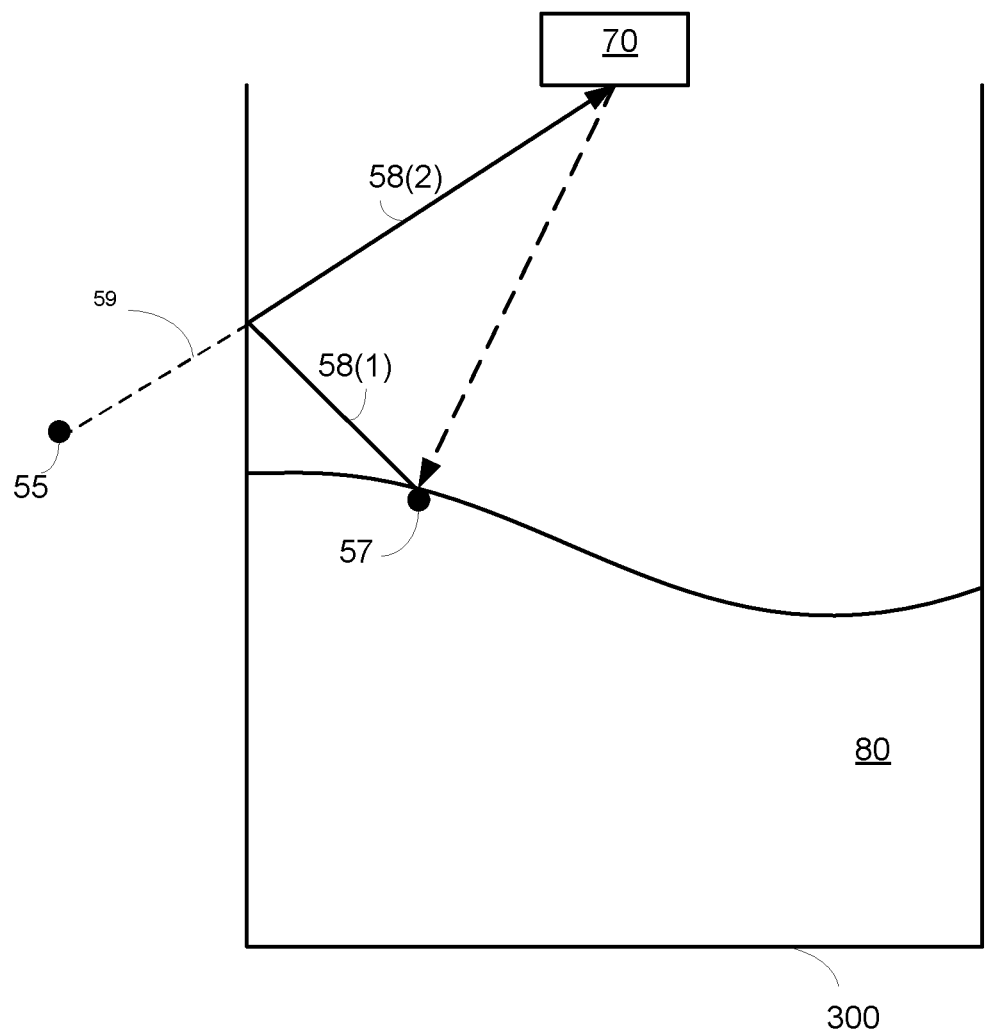
FIG. 9 illustrates a false echo that result from multi-path.

In addition to meaningful echo from the material, the system may get false echoes due to multipath trajectories. FIG. 8 illustrates a cross section of silo 300 that stores content 80, a transceiver 70 of the system illuminates a point 57 at the upper surface 90 of the content 80 with a pulse of radiation 56. The point 57 reflects the echo of the pulse of radiation 56 towards the left wall of the silo 300 (path 58(1)) and the left wall reflects that echo (path 58(2)) towards the transceiver 70.

Point 57 is the true origin of the echo 58 but due to the multipath the transceiver "sees" a false origin 55 that is located outside the silo 300—located at the DOA of path 58(2) but located at a distance (from transceiver 70) that equals the sum of paths 58(1) and 58(2).

The system can determine that false origin 55 is not the true origin of the echo based upon its relatively large distance outside the silo 300. The system may also apply a fuzzy logic algorithm on the false origin 55 and reduce the confidence level of received echo 58 that is associated with false origin.

The multi-path can be detected, additionally or alternatively by irradiating point 57 with pulses of other frequencies—wherein the multi-path may be expected to result in different received echoes.

The system 10 can detect false echoes and should not include such false echoes in the final content volume estimation.

In addition to the mentioned above (location outside the silo text) the system can detect false echoes by detecting an angle between a received echo origin and another received echo origin as being larger than the maximal content slope.

A false echo may be also detected by changing the angle of illumination of the same area, directing a pulse of radiation that has a null (or very low energy) energy at an origin of a received echo and a reception of an echo of substantial energy.

It is expected that "true" origins of echoes can be seen also in other perspectives such as transitions in different frequencies or different beam tilt. An echo that its origin is not verified by other perspectives may be regarded as a false echo and may receive a lower confidence level.

Dust and noise sources may modify the amplitude (temporarily eliminating an echo from the scanner) and direction of each echo.

The volume reading from the system 10 should be immune to fluctuations in dust density and noise. Noise from machinery outside the silo or changes in dust level should not create fluctuations in the reported volume levels.

False echo should be filtered effectively, resulting in a subgroup of echoes that are self-consistent between the members of the group and none of them violates some generals rules such as that all echo sources should be inside the bin.

The weight of echoes with low SNR should be lower than the weight of strong echoes with high SNR.

The system 10 can perform multiple measurements at different points in time and be arranged to provide stable measurement results over time. The system 10 may take into account that various parameters of the reflected echoes may fluctuate even when the content volume remains unchanged. The system 10 is arranged to have a sense of quality of the estimated information from each of the echoes. As signal quality per echo source is changing, reliable qualities attributes can assist in estimating the echo parameter at best quality signal.

The system 10 can provide stable results by tracking received echoes over time, assigning (using fuzzy module 20) confidence levels to origins of echoes, dynamically updating data structures that reflect reference echoes and deleting reference echoes in a smooth manner (after checking that the received could have receive echoes from that origins but did not received such echoes during multiple transmission and reception cycles). A single radiation pulse can be transmitted during a single transmission and reception cycle.

The receiver 50 may be arranged to detect peaks (maxima points) of received echoes and refer to these peaks when calculating TOA and DOA.

Figure 7:
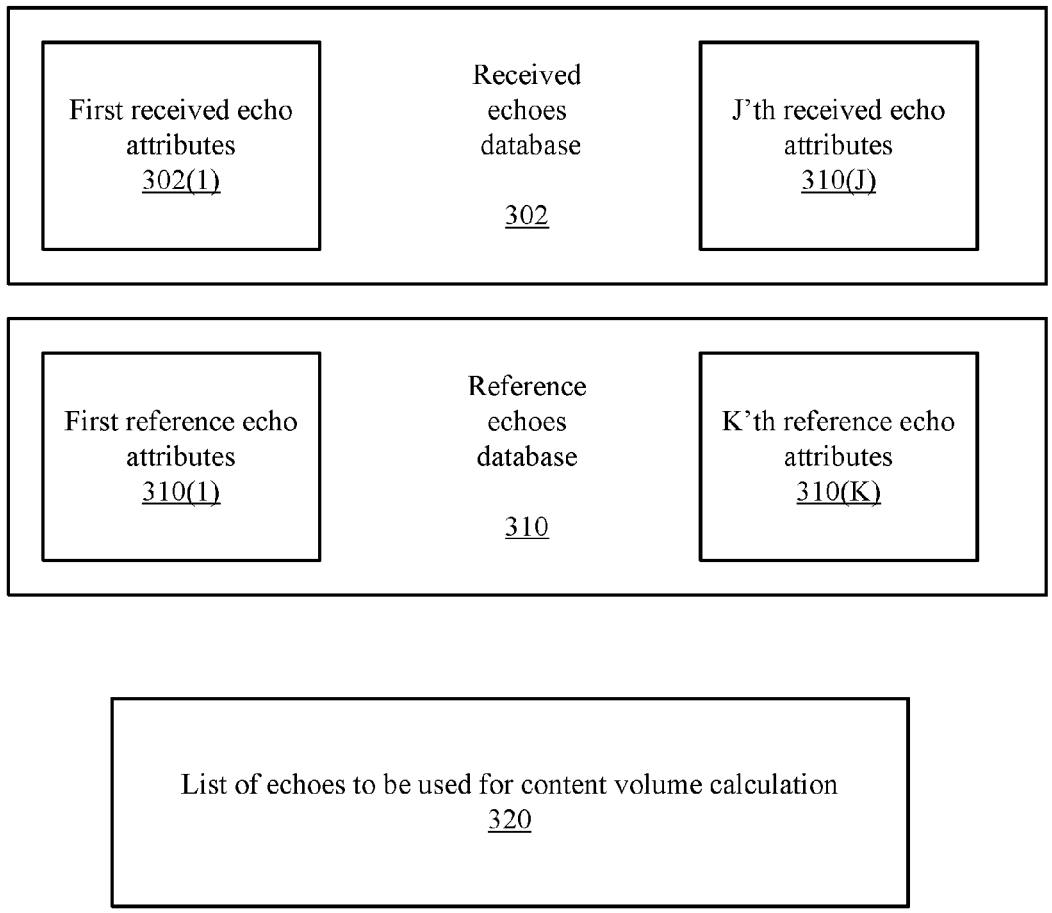
FIG. 7 illustrates various data structured accessed by and maintained by the system of FIG. 1 according to an embodiment of the invention.

The volume calculator 30 can maintain various data structures such as those illustrated in FIG. 7.

FIG. 7 illustrates a received echoes database 302 that stores attributes of received echoes 302(1)-302(J) (such as received echoes that were received as a result of an illumination of the content by one or more radiation pulses during one or more transmission and reception cycles).

FIG. 7 also illustrates a reference echoes database 310 that stores attributes of reference echoes 310(1)-310(K). The reference echoes were received in the past. The attributes of the reference echoes may be updated over time.

FIG. 7 further illustrates the list of echoes to be used for volume calculation 320. This list 320 can equal the reference echoes database 310 at the point in time in which the volume is calculated. Alternatively, the list 320 may differ from the reference echoes database 310 by the number of echoes it includes, by storing confidence levels and not attributes, by including more or less echoes that those included in database 310 and the like.

The volume calculator 30 may be arranged to update the reference echoes attribute data base by adding new reference echoes, deleting existing reference echoes, and changing attributes of the reference echoes.

In each transmission and reception cycle, the receiver 50 is arranged to receive one or multiple received echoes and identify the maxima point of each pulse.

Figure 6:
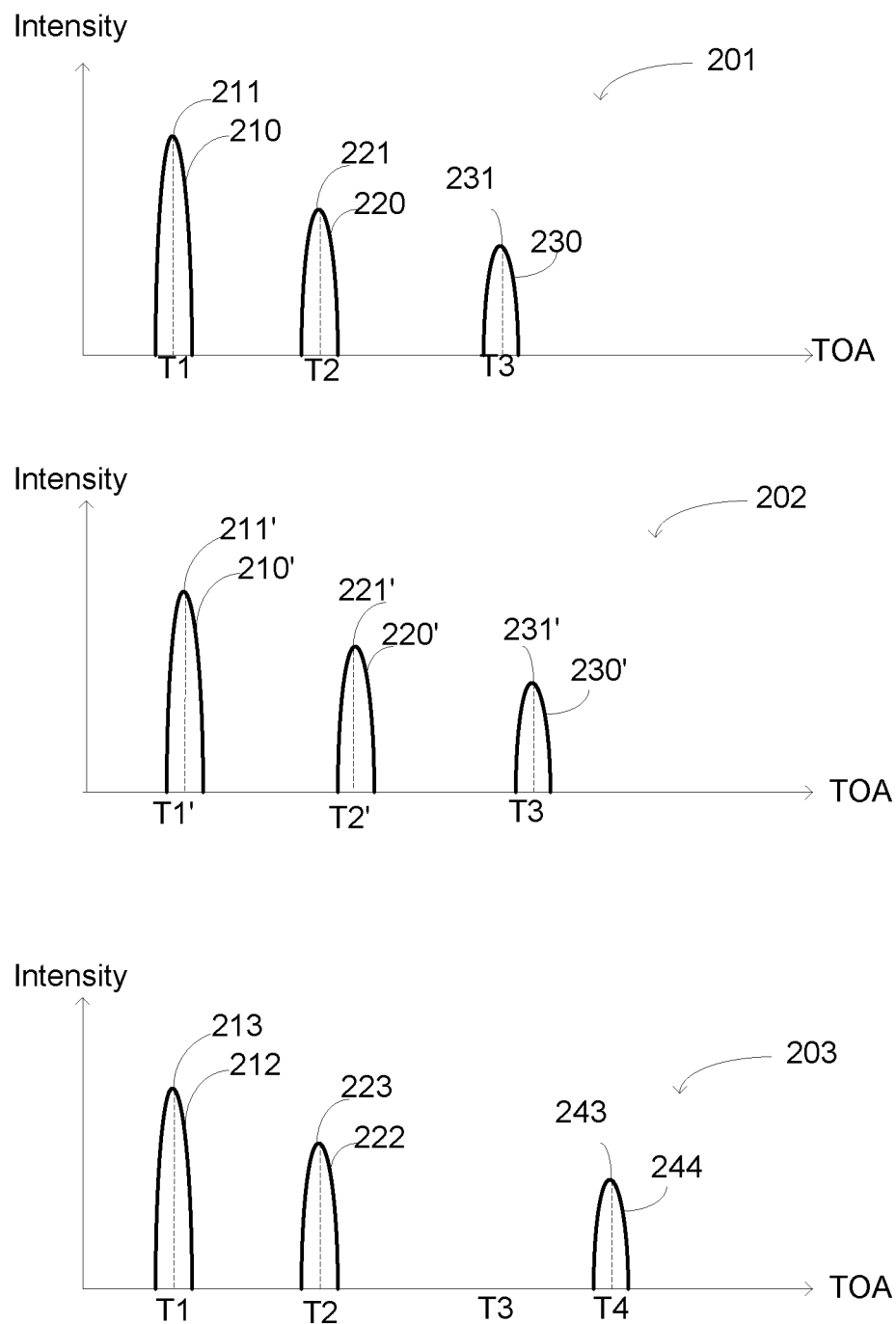
FIG. 6 shows various received echoes according to an embodiment of the invention.

FIG. 6 illustrates three graphs 201, 202 and 203 according to an embodiment of the invention.

Graph 201 includes three received echoes 210, 220 and 230 that were received during a first transmission and reception cycle by a first transceiver. Graph 202 includes three received echoes 210', 220' and 230' that were received during the first transmission and reception cycle by a second transceiver. The difference of TOA between received echoes 210 and 210', 220 and 220' as well as between 230 and 230' allows system 10 to calculate the DOA of these received echoes.

Graph 203 includes three received echoes 212, 222 and 232 that were received during a second transmission and reception cycle by the first transceiver.

FIG. 6 also illustrates maximum points 211, 221, 231, 211', 221', 231', 213, 223 and 233 of received echoes 210, 220, 230, 210', 220', 230', 212, 222 and 232.

Each maximum point of a received echo is associated with an origin of that received echo and the location of the origin is calculated by the TOA represented by the maximum point (T1, T2, T3, T1', T2', T3' and T4) and by its direction of arrival.

Received echoes 210 and 212 have substantially the same origin and are regarded as corresponding received echoes.

Received echoes 220 and 222 have substantially the same origin and are regarded as corresponding received echoes.

Graph 203 does not include received echo received echo 230. Thus, received echo 230 may be sent to a deletion process. If received echo 244 was not received prior to the second transmission and reception cycle then received echo 244 can be added as a new reference echo to database 310.

Volume calculator 30 is arranged to compare the received echoes to the reference echoes. If the reference echoes database 310 does not include a reference echo that corresponds to a received echo (there is no reference echo with substantially the same origin as the received echo) then the received echo can be added to the database 310 and be regarded as a new reference echo.

Reference echoes of the database that were expected to have a corresponding received echo—but such a received echo was not received—are fed to a deletion process that determined whether to delete these reference echoes from database 310.

The deletion process may ignore the lack of corresponding received echoes during transmission and reception cycles in which the SNR was too low for receiving such a corresponding received echo.

The deletion process may delete the reference echo from database 310 and/or list 320 if only a subset of expected received echoes were received—if only up to M corresponding received echoes were received during N transmission and reception cycles (during which the reception parameters facilitated the reception of such received echoes), wherein N exceeds M. M may be zero, N may be three or more.

Reference echoes that have a confidence level of zero (or almost zero) in database 310 and list 320 may not be deleted from the list 320 (and/or database 320) if the current SNR is lower than the minimal SNR under which they could have been detected.

Additionally or alternatively, a reference echo will be deleted from list and database 310 if it is found to be a false echo.

Referring back to FIG. 1, the fuzzly logic module 20 may be arranged to calculate a confidence level to every reference and/or received echo. The confidence level can be regarded as an attribute of a received echo and/or of a reference echo and may be stored in databases 302 and 310.

The fuzzy logic module 20 may apply one or more fuzzy logic algorithms and this contributes to the stability of the volume measurements that are executed by the volume calculator 30.

The confidence level of an echo may be calculated based upon one or more attributes of the echo. The attributes may include, for example, at least few of the following:

a. Signal to Noise Ratio attribute—the ratio between the energy of the signal and the noise. The noise is typically measured in a separated listening cycle.

b. Constant False Alarm (CFAR) Threshold attribute—the ratio between the energy of the echo and the average energy in the vicinity of the echo range.

c. Inside bin attribute—the coordinates of origin of the echo are determined by the estimation of the time of flight and the angle of arrival, knowing the silo geometry and the position of the scanner. It is required that the echo source will be inside the silo walls (including floor).

d. Physical limits attributes—reflects closeness to physical obstacles or other physical constraints that may be related to specific frequencies and/or DOA.

e. Relative energy attribute—In general, the closest echo to the transceiver (minimum range) should be a direct reflection and therefore is more trustable as an encore point in the process of building a consistent subgroup of echoes. However, there are cases where although the actual material level is far, there will be small residual echoes in close ranges due to objects in the silos or material build ups. To address this issue, the system locates the strongest echo, and then reduces the CL of echoes that are significantly (~×10) lower energy.

f. Contradiction in angle attribute—the slope of the upper surface of the content is expected be below a maximal slope value and slopes between origins should be below the maximal slope value.

Figure 10:
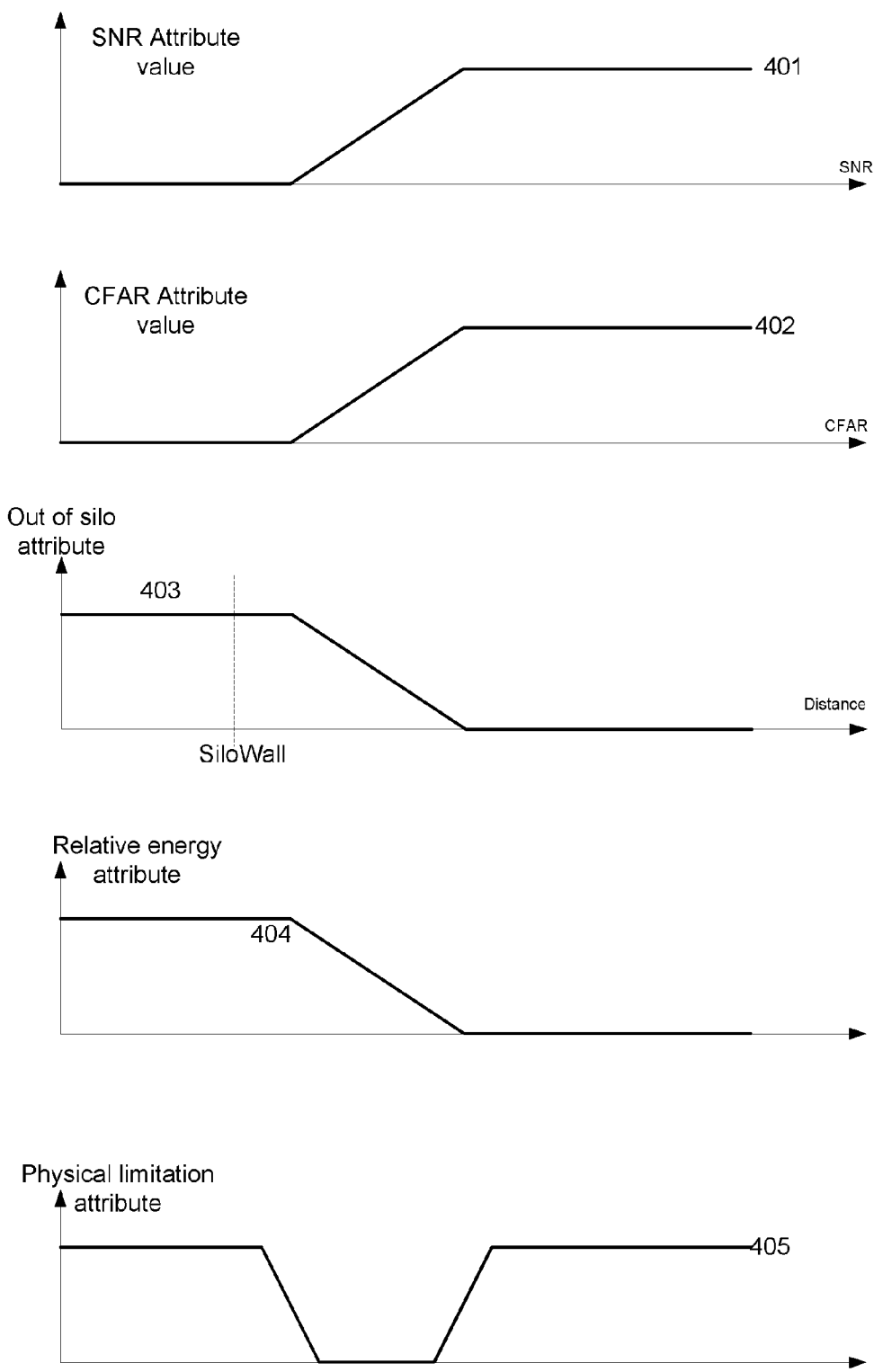
FIG. 10 illustrates linear fuzzy logic functions according to an embodiment of the invention.

FIG. 10 illustrates linear fuzzy logic functions according to an embodiment of the invention. Curves 401-405 represent the fuzzy logic functions applies on various parameter (SNR attribute, CFAR attribute, out of silo attribute, relative energy attribute, and physical limitation attribute respectively). The x-axis represent the value of the parameter and the y-axis represent the attribute value.

According to an embodiment of the invention the confidence level of an echo if a fuzzy logic function of some or all of these attributes. The fuzzy logic module 30 can set the confidence level of an echo as minimum value of all the attributes.

It is noted that each attribute may be calculated by applying a fuzzy logic function on a corresponding parameter (SNR, CFAR, relative energy, location in relation to the bin walls, slope . . . ) that was calculated by the receiver 50 or even by the volume estimator itself.

The contradiction in angle estimate can be detected and handled by the following process:

Sort the received echoes by their range (distance of the origin from the receiver).

Loop over all possible pairs of origins, per pair there is a closer echo (having confidence level CL1) and a distant echo (having a confidence level CL2).

Calculate a mutual confidence level (CL_A) for contradiction in angle.

In case of some contradiction in angle (CL_A<1), CL2 may be reduced (close range priority).

CL2 may be reduced in proportion to CL1 and CL2:
a. B=max((1−CL1), CL_A).
b. CL2=min(CL2, B).

The confidence level of an echo of the list 320 may determine the weight that is assigned to this echo in the calculation of the volume of the content 80.

A reference echo of low confidence level may be deleted from database 310 after not being received during multiple transmission/reception cycles during which it should have been received.

The system 10 may maintain in database 310 and list 320 many reference echoes with low confidence level before deletion and this may result in an improved stability as a removal (especially smooth removal) of low confidence level reference echoes will not dramatically change the estimation of volume of the content.

According to an embodiment of the invention the confidence level attribute can be updated only by increasing it over time. Thus, the confidence level attribute value may be kept to be of a value that reflects the best reception conditions of the reference pulse—for example—that of the best SNR.

After list 320 is ready the volume calculator can estimate the volume of the content in response to, especially it may perform the following calculation:

$$\text{Volume} = XYareaofBin \times \frac{\sum CL_i * Z_i}{\text{SUM}(CL_i)}$$

Wherein XYareaofBin represent the cross section of the bin along an imaginary XY plane that is normal to the Z axis, $Z_i$ is the height of the i'th origin (the sum is over all origins included in list 320), $CL_i$ is the confidence level of the i'th origin of the list 320.

FIG. 7 illustrate origins 99 that are expected to form the upper surface of the content, and the height ($Z_i$ 98) of one point. The list 320 may include all origins 99 or a subset of origins 99.

If the XY cross section of the bin changes as a function of the height of the bin than the multiplication is replaced by an integral.

$$\text{Volume} = \int \left( XYareaofBin(Z_i) \times \frac{\sum CL_i * Z_i}{\text{SUM}(CL_i)} \right)$$

Figure 3:
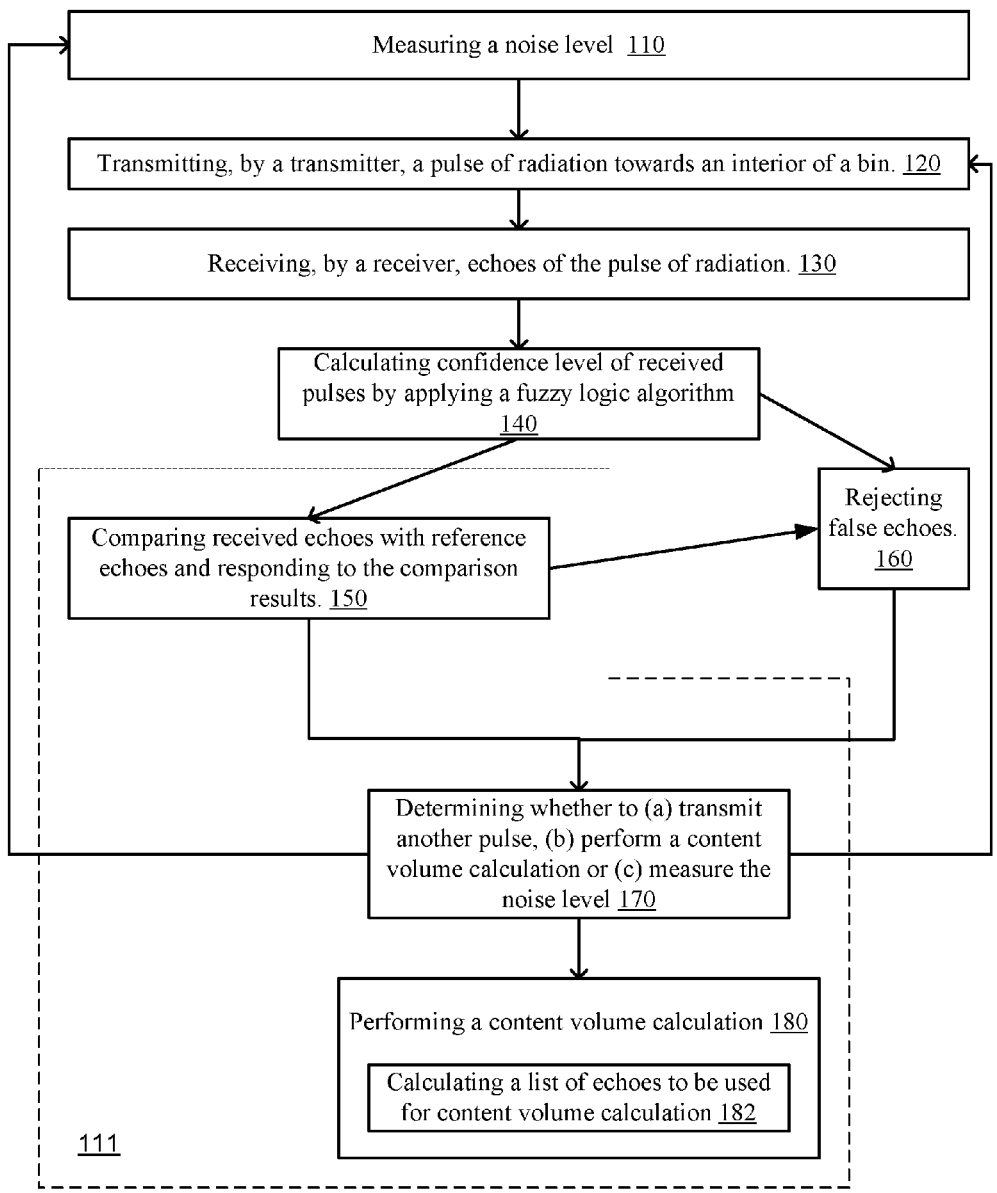
FIG. 3 illustrates a method according to an embodiment of the invention.

FIG. 3 illustrates method 100 according to an embodiment of the invention.

Method 100 may start by stage 110 of measuring a noise level. This stage can be done in a cyclic manner, in response to an event (such as a reduction in the SNR). It may be executed one every multiple transmission and reception cycles.

Stage 110 may be followed by stage 120 of transmitting, by a transmitter, a pulse or radiation towards an interior of the bin.

Stage 130 may be followed by stage 130 of receiving, by a receiver, echoes of the pulse of radiation.

Stage 130 may include calculating received echo parameters such as SNR, CAFR, location in relation to silo, relative energy and the like.

Stage 130 may include detecting peaks of the received echoes, and calculating time of arrival of the peaks and direction of arrival of the received echoes.

Stage 130 may include changing attributes of a received echo based upon attributes of another received echo—this may include calculating the relative energy attribute.

Stage 130 may be followed by stage 170 of removing false echoes and by stage 140.

Stage 140 may include applying, by a fuzzy logic module, a fuzzy logic algorithm for calculating, in response to the received echoes, confidence levels of origins of received echoes; wherein the received echoes are reflected or scattered from the origins.

Stage 140 may include stages 141, 145 and 146. Stage 141 is followed by stage 145 that in turn is followed by stage 146.

Stage 141 may include applying fuzzy logic algorithm to calculate attributes of a received echo. Stage 141 may include calculating any of the attributes mentioned in the specification and/or other attributes. Stage 141 is illustrated as including: (a) stage 144 of applying fuzzy logic algorithm to calculate SNR attribute of received echo, (b) stage 142 of applying fuzzy logic algorithm to calculate CFAR attribute of received echo, and/or stage 143 of (c) applying fuzzy logic algorithm to calculate physical limitation (such as inclusion in bin) attribute of received echo.

Stage 145 includes calculating confidence level of the received echo in response to attributes of the received echo.

Stage 146 may include updating the confidence level of a received echo in response to an attribute of another received echo. Stage 146 is illustrated as including: (a) stage 147 of updating the confidence level by applying a fuzzy logic algorithm on angles formed between origins of received echo and another echo, and (b) stage 148 of updating the confidence level by applying a fuzzy logic algorithm on ratio between intensities of received echo and other received echo.

Stage 140 may be followed by stage 111 of calculating, by a volume calculator, the volume of the content in response to (a) estimated locations of the origins, and (b) the confidence levels of the origins.

Stage 111 may include stages 150, 160, 180 and 190. Stage 170 may be followed by stage 111.

Stage 150 may include comparing received echoes to reference echoes. The reference echoes can be stored in a data structure such as database 310.

Stage 150 may be followed by stage 160 of responding to the comparison results. This may include adding a reference echo to the database, updating an attribute of a reference echo, deleting a reference echo from the database.

Stage 160 may include:
a. Updating at least one attribute of a reference echo in response to a comparison result out of the comparison results.

b. Determining to update the at least one attribute of the reference echo if the comparison result indicates that a signal to noise ratio of the reference echo is lower than a signal to noise ratio of a received echo that corresponds to the reference echo.
c. Deleting from the database of reference echo a reference echo that is associated with an origin that did not reflect or scatter a received echo during multiple transmission and reception cycles.
d. The method according to claim 24, comprising deleting the reference echo if during the multiple transmission and reception cycles a noise level facilitated a reception of received echoes from the origin.

Figure 4:
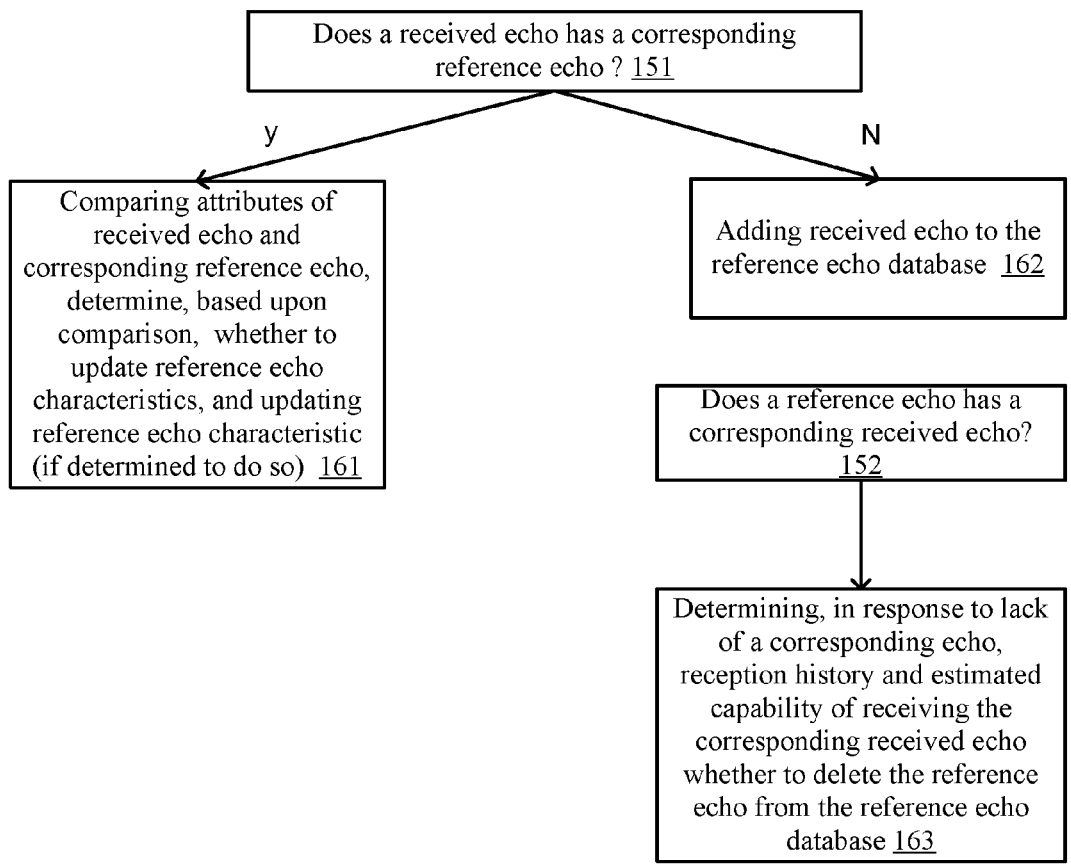
FIG. 4 illustrates various stages of the method of FIG. 3 according to an embodiment of the invention.
Figure 5:
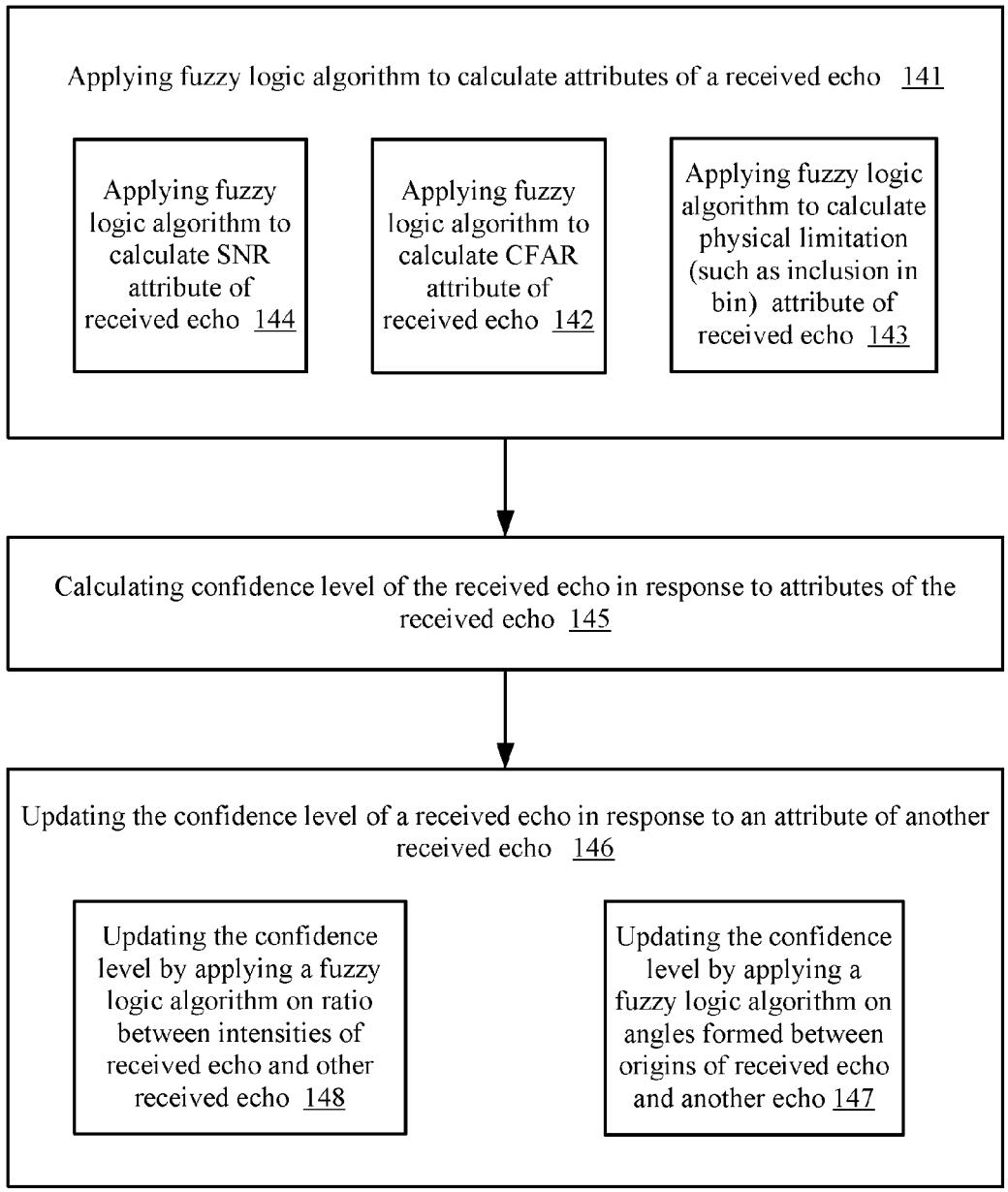
FIG. 5 illustrates various stages of the method of FIG. 3 according to an embodiment of the invention.

FIG. 4 illustrates stage 150 as including stages 151 and 152 and illustrates stage 160 as including stages 161, 162 and 163.

Stage 151 includes checking whether a received echo has a corresponding reference echo.

If the answer is positive (Y) then stage 151 is followed by stage 161 of comparing attributes of received echo and corresponding reference echo, determine, based upon comparison, whether to update reference echo characteristics, and updating reference echo characteristic (if determined to do so).

If the answer is negative (N) then stage 151 is followed by stage 162 of adding received echo to the reference echo database.

Stage 152 may include determining whether a reference echo has a corresponding received echo. If the answer is negative then stage 152 may be followed by stage 163 of determining, in response to lack of a corresponding echo, reception history (reception of lack of reception of previous corresponding received echo s) and estimated capability of receiving the corresponding received echo whether to delete the reference echo from the reference echo database.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A system for estimating a volume of a content of a bin, the system comprising:
   at least three acoustic transceivers that are non-collinear;
   wherein a transmitter of an acoustic transceiver of the at least three acoustic transceivers is configured to transmit pulses of radiation towards an interior of the bin;
   wherein a receiver of at least one of the acoustic transceivers is configured to receive received echoes of the pulses of radiation;
   a fuzzy logic module arranged to apply a fuzzy logic algorithm for calculating, in response to the received echoes, confidence levels of origins of received echoes;
   wherein the received echoes are reflected or scattered from the origins; and
   a volume calculator that is arranged to calculate the volume of the content in response to (a) estimated locations of the origins, and (b) the confidence levels of the origins; and
   wherein the volume calculator is arranged to classify a received echo as a false echo when an origin of the receive echo is positioned outside the bin.

2. The system according to claim 1, wherein the receiver of the at least one of the acoustic transceivers is arranged to detect peaks of the received echoes, and to calculate times of arrivals of the peaks and directions of arrivals of the received echoes.

3. The system according to claim 1, wherein the receiver of the at least one of the acoustic transceivers is arranged to calculate received echoes parameters; and wherein the fuzzy logic module is arranged to calculate received echoes attributes by applying a fuzzy logic algorithm on the received echoes parameter.

4. The system according to claim 1, wherein the fuzzy logic module is arranged to calculate at least one received echo attribute out of a signal to noise ratio attribute and a constant false alarm threshold attribute.

5. The system according to claim 1, wherein the fuzzy logic module is arranged to apply a non-linear fuzzy logic algorithm.

6. The system according to claim 1, wherein the fuzzy logic module is arranged to apply a linear fuzzy logic algorithm.

7. The system according to claim 1, wherein the volume calculator is arranged to maintain a database of reference echoes and to compare received echoes to reference echoes to provide comparison results.

8. The system according to claim 7, wherein the volume calculator is arranged to update at least one attribute of a reference echo in response to a comparison result out of the comparison results.

9. The system according to claim 8, wherein the volume calculator is arranged to determine to update the at least one attribute of the reference echo if the comparison result indicates that a signal to noise ratio of the reference echo is lower than a signal to noise ratio of a received echo that corresponds to the reference echo.

10. The system according to claim 7, wherein the volume calculator is arranged to delete from the database of reference echoes a reference echo that is associated with an origin that did not reflect or scatter a received echo during multiple transmission and reception cycles.

11. The system according to claim 10, wherein the volume calculator is arranged to delete the reference echo from the database of the reference echoes if during the multiple transmission and reception cycles a noise level facilitated a reception of received echoes from the origin.

12. The system according to claim 1, wherein the volume calculator is arranged to detect false echoes.

13. The system according to claim 1, wherein the volume calculator is arranged to change attributes of a received echo based upon attributes of another received echo.

14. The system according to claim 1, wherein the volume calculator is arranged to classify a received echo as a false echo if a virtual slope formed between the origin of the received echo and an origin of another origin exceeds a maximal allowable slope of the content.

15. A computerized method for estimating a volume of content of a bin, comprising:
   transmitting by a transmitter of an acoustic transceiver of the at least three acoustic transceivers that are non-collinear, pulses of radiation towards an interior of the bin;
   receiving by a receiver of at least one of the acoustic transceivers, received echoes of the pulses of radiation;
   applying, by a fuzzy logic module, a fuzzy logic algorithm for calculating, in response to the received echoes, confidence levels of origins of received echoes;

wherein the received echoes are reflected or scattered from the origins;

calculating, by a volume calculator, the volume of the content in response to (a) estimated locations of the origins, and (b) the confidence levels of the origins; and classifying a received echo as a false echo when an origin of the receive echo is positioned outside the bin.

16. The method according to claim 15, comprising detecting peaks of the received echoes, and calculating times of arrivals of the peaks and directions of arrivals of the received echoes.

17. The method according to claim 15, comprising calculating received echoes parameters; and calculating received echoes attributes by applying a fuzzy logic algorithm on the received echoes parameter.

18. The method according to claim 15, calculating at least one received echo attribute out of a signal to noise ratio attribute and a constant false alarm threshold.

19. The method according to claim 15, comprising applying a non-linear fuzzy logic algorithm.

20. The method according to claim 15, comprising applying a linear fuzzy logic algorithm.

21. The method according to claim 15, comprising maintaining a database of reference echoes and comparing received echoes to reference echoes to provide comparison results.

22. The method according to claim 21, comprising updating at least one attribute of a reference echo in response to a comparison result out of the comparison results.

23. The method according to claim 22, comprising determining to update the at least one attribute of the reference echo if the comparison result indicates that a signal to noise ratio of the reference echo is lower than a signal to noise ratio of a received echo that corresponds to the reference echo.

24. The method according to claim 21, comprising deleting from the database of reference echoes a reference echo that is associated with an origin that did not reflect or scatter a received echo during multiple transmission and reception cycles.

25. The method according to claim 24, comprising deleting the reference echo from the database of reference echoes if during the multiple transmission and reception cycles a noise level facilitated a reception of received echoes from the origin.

26. The method according to claim 15, comprising detecting false echoes.

27. The method according to claim 15, comprising changing attributes of a received echo based upon attributes of another received echo.

28. The method according to claim 15, comprising classifying a received echo as a false echo if a virtual slope formed between the origin of the received echo and an origin of another origin exceeds a maximal allowable slope of the content.

29. The method according to claim 15, wherein the method comprises receiving echoes of the pulses of acoustic energy.

30. A non-transitory computer readable medium that stores instructions that cause a computerized system to: apply a fuzzy logic algorithm for calculating, in response to received echoes that are received by a receiver of at least one acoustic transceiver out of at least three non-collinear acoustic transceivers, confidence levels of origins of received echoes; wherein the received echoes are reflected or scattered from the origins; calculate a volume of a content of a bin in response to (a) estimated locations of the origins, and (b) the confidence levels of the origins; and classify a received echo as a false echo when an origin of the receive echo is positioned outside the bin.

\* \* \* \* \*